(12) United States Patent
Heo

(10) Patent No.: US 12,031,811 B2
(45) Date of Patent: Jul. 9, 2024

(54) OBJECT SIZE ESTIMATION APPARATUS AND METHOD

(71) Applicant: HL Klemove Corp., Pyeongtaek-si (KR)

(72) Inventor: OhCheol Heo, Suwon-si (KR)

(73) Assignee: HL KLEMOVE CORP., Incheon (KR)

( * ) Notice: Subject to any disclaimer, the term of this patent is extended or adjusted under 35 U.S.C. 154(b) by 279 days.

(21) Appl. No.: 17/560,792

(22) Filed: Dec. 23, 2021

(65) Prior Publication Data

US 2022/0205779 A1   Jun. 30, 2022

(30) Foreign Application Priority Data

Dec. 24, 2020   (KR) .......................... 10-2020-0183320

(51) Int. Cl.
*G01B 11/25* (2006.01)
*G01B 11/00* (2006.01)

(52) U.S. Cl.
CPC .......... *G01B 11/254* (2013.01); *G01B 11/002* (2013.01); *G01B 11/2513* (2013.01)

(58) Field of Classification Search
CPC . G01B 11/002; G01B 11/2513; G01B 11/254; G01B 15/00; G01S 17/931
USPC ........................................................ 356/605
See application file for complete search history.

(56) References Cited

U.S. PATENT DOCUMENTS

| 2017/0315224 A1* | 11/2017 | Mizutani | G01S 7/352 |
| 2018/0267172 A1* | 9/2018 | Oh | G01S 19/45 |
| 2019/0050650 A1* | 2/2019 | Takaki | G06T 7/60 |

FOREIGN PATENT DOCUMENTS

| DE | 112015005410 T5 | 8/2017 |
| DE | 112020007006 T5 | 1/2023 |
| JP | 3630077 B2 * | 3/2005 |
| JP | 5316549 B2 | 10/2013 |
| JP | 2014206411 A | 10/2014 |

OTHER PUBLICATIONS

JP with translation (Year: 2005).*
Office Action issued in Korean Patent Application No. 10-2020-0183320 dated Nov. 24, 2023.
Office Action issued in Germany Patent Application No. 102021134303.8 dated May 23, 2024.

* cited by examiner

*Primary Examiner* — Sunghee Y Gray
(74) *Attorney, Agent, or Firm* — Harvest IP Law, LLP

(57) ABSTRACT

The disclosure relates to an object size estimation device and method. According to the disclosure, an object size estimation device comprises a reception unit receiving a reception signal reflected by the object, through the reception antenna, an object length calculation unit calculating a reflection point based on a position frequency of measurements included in the reception signal, calculating a horizontal length of the object based on a distance between a first straight line passing through the calculated reflection point and a measurement and calculating a vertical length of the object based on a distance between a second straight line orthogonal to the first straight line and a measurement, and an object size estimation unit estimating a size of the object formed with the horizontal length and the vertical length.

14 Claims, 9 Drawing Sheets

FIG.5
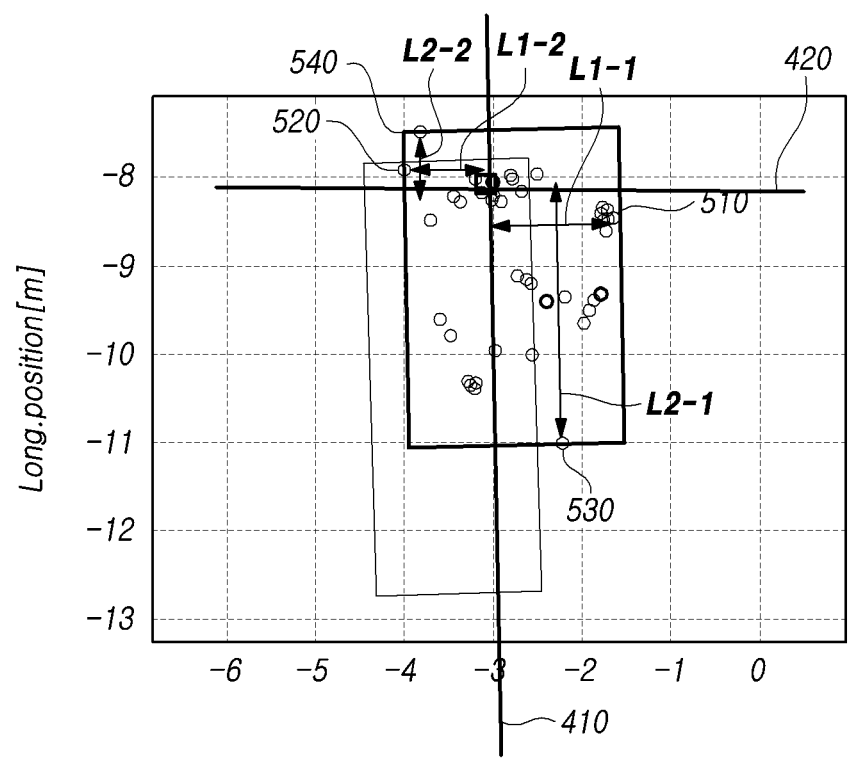
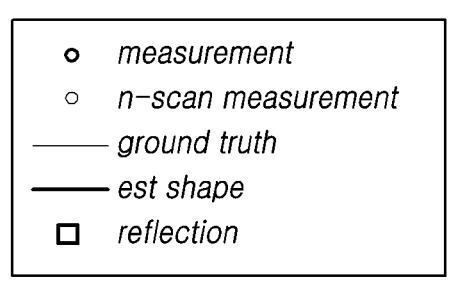

FIG.6
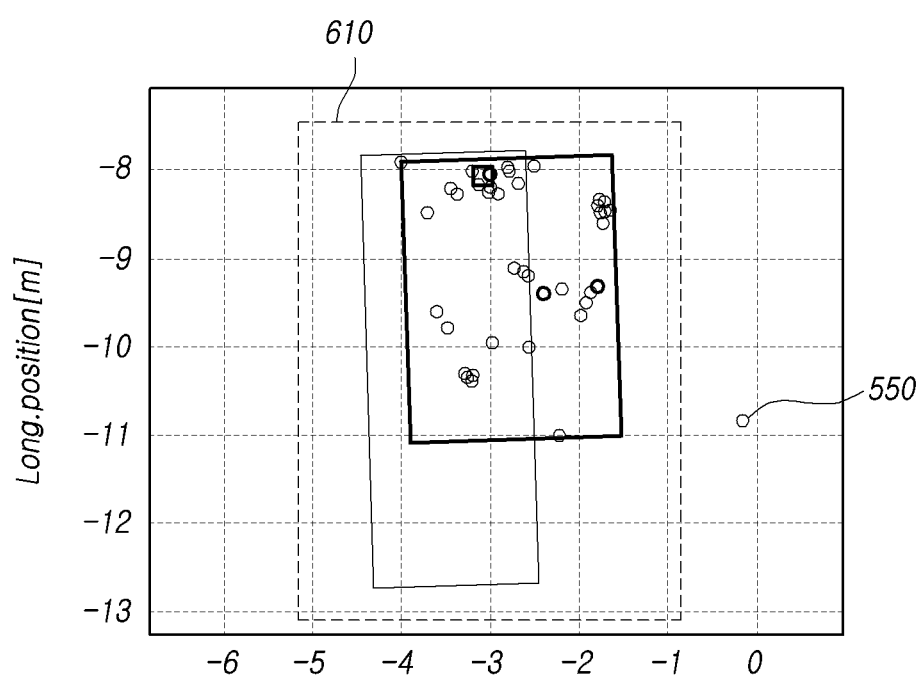
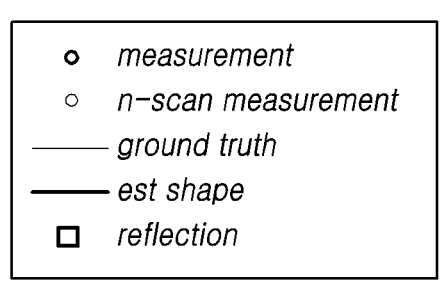

OBJECT SIZE ESTIMATION APPARATUS AND METHOD

CROSS-REFERENCE TO RELATED APPLICATION

This application claims priority from Korean Patent Application No. 10-2020-0183320, filed on Dec. 24, 2020, which is hereby incorporated by reference for all purposes as if fully set forth herein.

BACKGROUND

Field

The present embodiments relate to an object size estimation device and method for estimating the size of an object.

Description of Related Art

Sensors, e.g., Lidar (light detection and ranging), or cameras or information about a preceding vehicle, received from surrounding vehicles via V2V communication, may be used to estimate the size of the vehicle so as to recognize the preceding vehicle.

However, Lidar mostly obtains results only for either the longitudinal or lateral surface in measuring on the preceding vehicle while, only in limited contexts, measuring both the longitudinal and lateral surfaces of the target vehicle to figure out the size. Thus, if the target vehicle partially falls outside the field of view or is hidden, its size cannot be known.

V2V communication information may allow the precise size to be known but, in normal situations, may not provide sufficient positional accuracy since the relative position relies on GPS.

BRIEF SUMMARY

In the above background, the disclosure provides an object size estimation device and method for estimating the size of an object through accrued measurements.

To achieve the foregoing objectives, in an aspect of the disclosure, there is provided an object size estimation device comprising an antenna unit including at least one transmission antenna and at least one reception antenna, a radar signal transmission unit transmitting a radar signal to an object using the transmission antenna, a reception unit receiving a reception signal reflected by the object, through the reception antenna, an object length calculation unit calculating a reflection point based on a position frequency of measurements included in the reception signal, calculating a horizontal length of the object based on a distance between a first straight line passing through the calculated reflection point and a measurement and calculating a vertical length of the object based on a distance between a second straight line orthogonal to the first straight line and a measurement, and an object size estimation unit estimating a size of the object formed with the horizontal length and the vertical length.

In another aspect of the disclosure, there is provided an object size estimation method comprising an operation information reception step transmitting a radar signal to an object using a transmission antenna and receiving a reception signal reflected by the object through a reception antenna, an object length calculation step calculating a reflection point based on a position frequency of measurements included in the reception signal, calculating a horizontal length of the object based on a distance between a first straight line passing through the calculated reflection point and a measurement and calculating a vertical length of the object based on a distance between a second straight line orthogonal to the first straight line and a measurement, and an object size estimation step estimating a size of the object formed with the horizontal length and the vertical length.

According to the disclosure, the object size estimation device and method is able to estimate the size of an object using measurements and enhance the performance of the autonomous emergency braking (AEB)/adaptive cruise control (ACC) system using the estimated size information about the detected object.

DESCRIPTION OF DRAWINGS

The above and other objects, features, and advantages of the present disclosure will be more clearly understood from the following detailed description, taken in conjunction with the accompanying drawings, in which:

FIG. 5 is a view illustrating an example of calculating a length of an object according to an embodiment;

FIG. 6 is a view illustrating an example of filtering a measurement depending on a size estimation range according to an embodiment;

DETAILED DESCRIPTION

Figure 1:
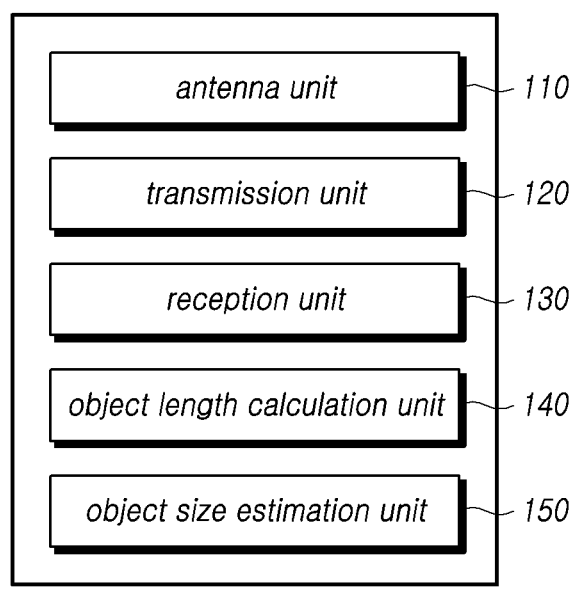
FIG. 1 is a block diagram illustrating an object size estimation device according to an embodiment of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

An object size estimation method 10 is described below with reference to the accompanying drawings, according to an embodiment of the disclosure.

FIG. 1 is a block diagram illustrating an object size estimation device 10 according to an embodiment of the disclosure.

Referring to FIG. 1, according to an embodiment of the disclosure, an object size estimation device 10 may include an antenna unit 110, a transmission unit 120, a reception unit 130, an object length calculation unit 140, and an object size estimation unit 150.

According to an embodiment of the disclosure, the object size estimation device 10 may be an advance driver assistance system (ADAS) that is equipped in a host vehicle 11 to provide information helpful for driving the host vehicle 11 or assist the driver in the host vehicle 11.

Here, ADAS may refer to various types of advanced driver assistance systems and may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, embodiments of the disclosure are not limited thereto.

The object size estimation device 10 may be equipped in the host vehicle 11. The object size estimation device 10 may detect an object 20 approaching the host vehicle 11, estimate the size of the object 20, and detect an object 20, which is stationary or on the move, approaching within a detection range of the object size estimation device 10 while the host vehicle 11 is traveling to estimate the size of the object 20.

The host vehicle 11 may refer to a vehicle that is equipped with a prime mover to roll the wheels by the power therefrom to move on the ground without a pre-built railway or track. Further, the host vehicle 11 may be an electric vehicle that is an electricity-powered vehicle that obtains driving energy by rotating a motor with electricity from a battery rather than obtaining driving energy from combustion of a fossil fuel.

The object size estimation device 10 is applicable both where the host vehicle 11 is a manned vehicle or where the host vehicle 11 is an autonomous vehicle.

The antenna unit 110 may include one or more transmission antennas and one or more reception antennas. Each transmission/reception antenna may be an array antenna including one or more radiation elements connected in series through feeding lines but is not limited thereto.

The antenna unit 110 may include a plurality of transmission antennas and a plurality of reception antennas and may have various array structures depending on the arrayed order and arrayed interval.

The transmission unit 120 may switch to one of the plurality of transmission antennas included in the antenna unit 110 to transmit transmission signals through the switched transmission antenna or may transmit transmission signals through multiple transmission channels allocated to the plurality of transmission antennas.

The transmission unit 120 may include an oscillation unit that generates transmission signals for one transmission channel allocated to the switched transmission antenna or multiple transmission channels allocated to the plurality of transmission antennas. The oscillation unit may include, e.g., a voltage-controlled oscillator (VCO) and an oscillator.

The reception unit 130 may receive the reception signal reflected by the object 20 through the reception antenna.

The reception unit 130 may switch to one of the plurality of reception antennas and receive the reception signal, which is the transmission signal reflected by the target, through the switched reception antenna or receive the reception signal through multiple reception channels allocated to the plurality of reception antennas.

The reception unit 130 may include, e.g., a low noise amplifier (LNA) that low-noise amplifies the reception signal, which is received through one reception channel allocated to the switched reception antenna or through multiple reception channels allocated to the plurality of reception antennas, a mixer that mixes the low-noise amplified reception signal, an amplifier that amplifies the mixed reception signal, and an analog-digital converter (ADC) that converts the amplified reception signal into a digital signal to thereby generate reception data.

Figure 2:
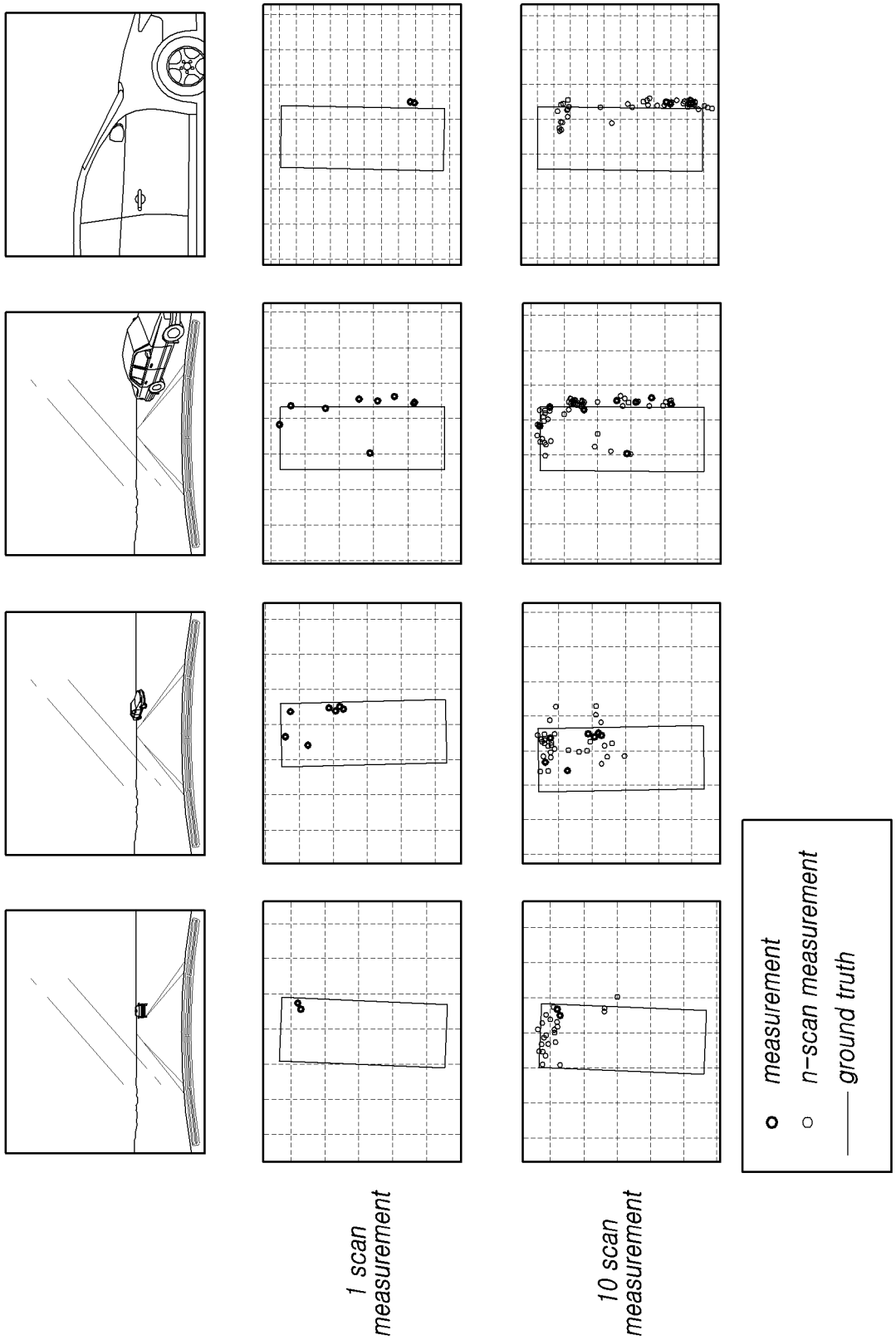
FIG. 2 is a view illustrating a position of a measurement according to an embodiment.

FIG. 2 is a view illustrating a position of a measurement according to an embodiment.

The object length calculation unit 140 may calculate a reflection point based on the frequency of position of the measurements included in the reception signal, calculate the horizontal length of the object 20 based on the distance between a first straight line 410 passing through the calculated reflection point and the measurement, and calculate the vertical length of the object 20 based on the distance between a second straight line 420 orthogonal to the first straight line 410 and the measurement.

Referring to FIG. 2, the actual position of the object 20 and the position of the measurement included in the reception signal may be represented through two-dimensional coordinates, and the number of received measurements may vary depending on the position of the object 20. The time from accruing the position of the measurement included in the reception signal by transmitting a transmission signal by the transmission antenna included in the antenna unit 110 and receiving the reception signal to transmitting another transmission signal through the transmission antenna may be referred to as a scan period, nth scan, or detection period.

The object length calculation unit 140 may calculate the length of the object 20 based on the measurement received in the first scan (1 Scan) of FIG. 2 and calculate the length of the object 20 based on the measurement received in the tenth scan (10 Scan) of FIG. 2. The object size estimation device 10 may perform the last scan which is the basis of the calculation of the length of the object 20 and the next scan and may calculate the length of the object 20 simultaneously with performing the next scan.

Figure 3:
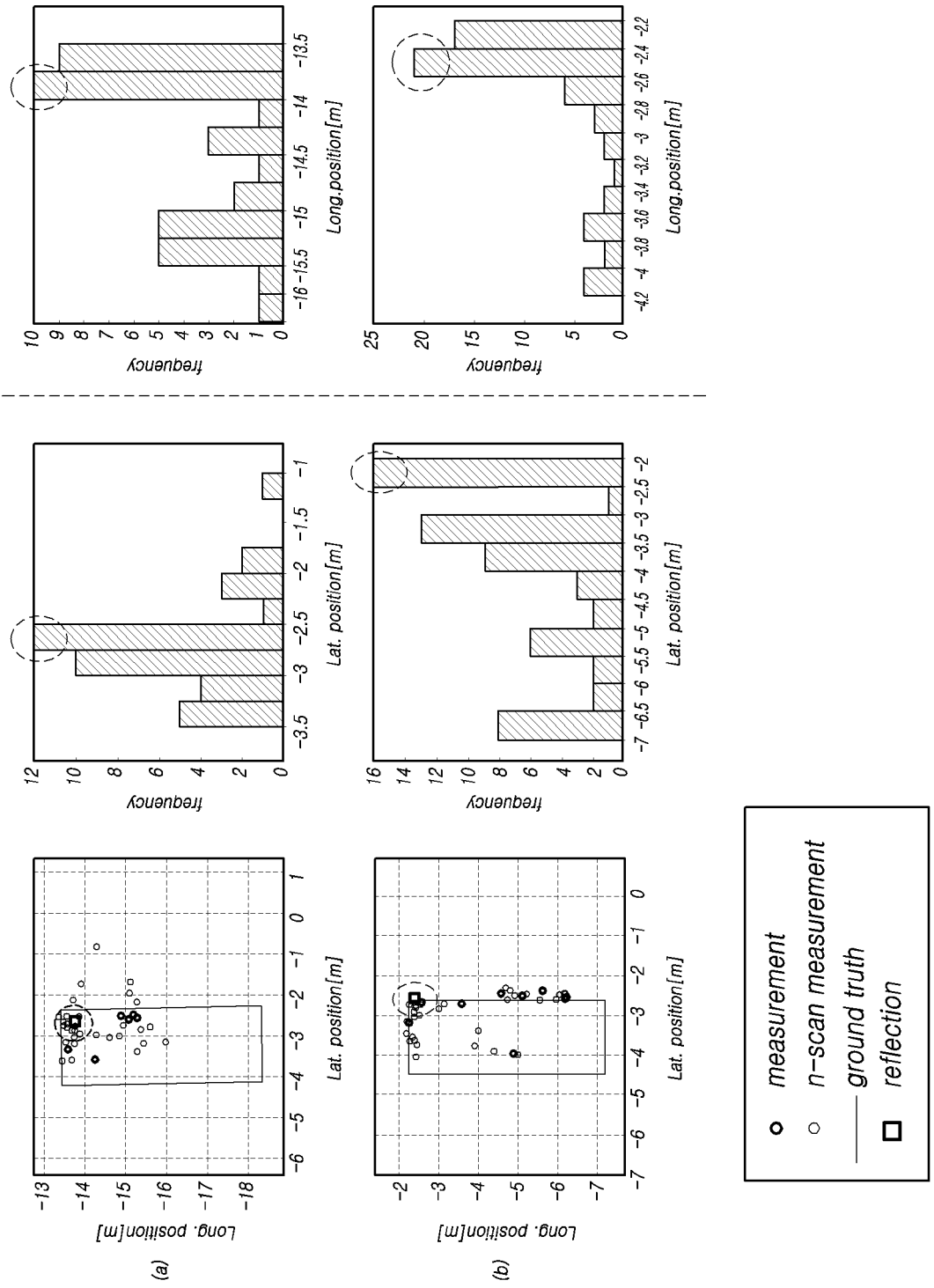
FIG. 3 is a view illustrating an example of calculating a reflection point according to an embodiment.

FIG. 3 is a view illustrating an example of calculating a reflection point according to an embodiment.

Referring to FIG. 3, the object length calculation unit 140 may calculate the reflection point based on the position frequency of the measurements included in the reception signals. Specifically, the object length calculation unit 140 may calculate the reflection point with the two-dimensional coordinates of the coordinate having the highest horizontal position frequency and the coordinate having the highest vertical position frequency based on the horizontal position frequencies and the vertical position frequencies of the measurements received up to the nth scan.

Referring to FIG. 3, for example, in a of FIG. 3, the horizontal positions of the plurality of received measurements have the highest frequency of 12 at a value between −2.5 and −2.75, and the vertical positions have the highest frequency of 10 at a value between −13.75 and—14. Thus, the object length calculation unit 140 may calculate the reflection point by applying each value having the highest frequency as the two-dimensional coordinate.

As another example, in b of FIG. 3, the horizontal positions of the plurality of received measurements have the highest frequency of 16 at a value between −2.5 and—2, and the vertical positions have the highest frequency of 21 at a value between −2.6 and—2.4. Thus, the object length calculation unit 140 may calculate the reflection point by applying each value having the highest frequency as the two-dimensional coordinate.

As the above-described horizontal position value and vertical position value for calculating the frequencies of the horizontal position and the vertical position, the values included in each preset interval may be calculated as the frequency corresponding to each interval. The value corresponding to the calculated highest frequency may be calculated as the intermediate value of the interval corresponding thereto.

For example, in a of FIG. 3, the frequency may be calculated, with each interval set to 0.25. Accordingly, in a of FIG. 3, the horizontal position value of the reflection point may be −2.625, and the vertical position value may be −13.875.

As another example, in b of FIG. 3, the frequency may be calculated with the horizontal interval and the vertical interval set to 0.5 and 0.2, respectively. Accordingly, in b of FIG. 3, the horizontal position value of the reflection point may be −2.25, and the vertical position value may be −2.5.

Figure 4:
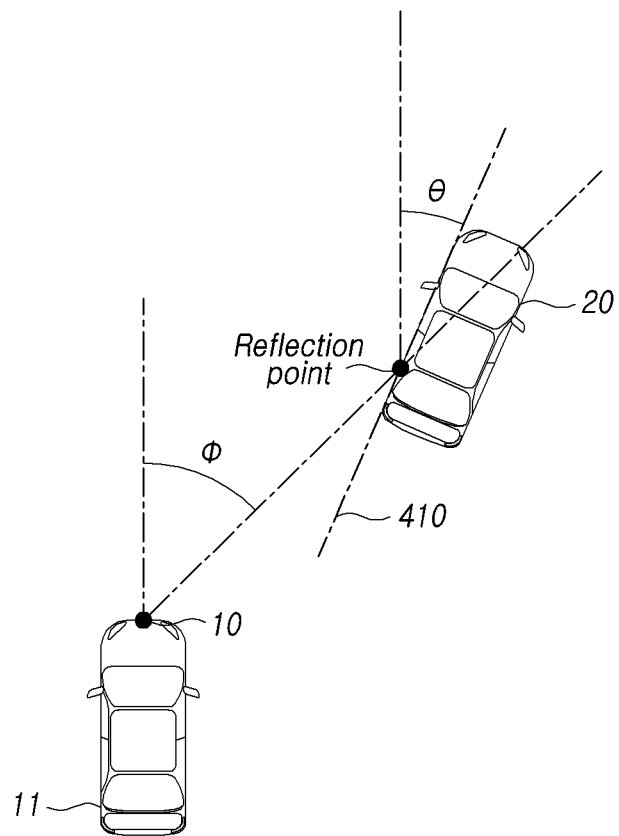
FIG. 4 is a view illustrating a first straight line passing through a reflection point according to an embodiment.

FIG. 4 is a view illustrating a first straight line 410 passing through a reflection point according to an embodiment.

The object length calculation unit 140 may calculate the horizontal length of the object 20 based on the distance between the measurement and the first straight line 410 passing through the calculated reflection point.

Referring to FIG. 4, the first straight line 410 may form a predetermined angle with respect to the traveling direction of the host vehicle 11. The predetermined angle may be calculated based on the longitudinal velocity and the lateral velocity detected in the object 20.

The first straight line 410 may pass through the reflection point while being angled by a predetermined angle θ with respect to the traveling direction of the host vehicle 11. φ may be the detection angle of the reflection point and the traveling direction of the host vehicle.

Here, θ may be calculated through the position and velocity $D_x$, $D_y$, $V_x$, $V_y$ of the object 20 estimated through a Kinematic model, as expressed in Equation 1 below, based on the velocity of the object 20 detected from a vehicle velocity sensor.

$$x_k = F_k x_{k-1} + w_k \quad F_k = \begin{bmatrix} 1 & 0 & 1 & 0 \\ 0 & 1 & 0 & 1 \\ 0 & 0 & 1 & 0 \\ 0 & 0 & 0 & 1 \end{bmatrix} \quad \text{[Equation 1]}$$
$$z_k = H_k z_{k-1} + v_k$$

$$H_k = \begin{bmatrix} 1 & 0 & 0 & 0 \\ 0 & 1 & 0 & 0 \end{bmatrix} \quad x_k = \begin{bmatrix} D_x \\ D_y \\ V_x \\ V_y \end{bmatrix} \quad z_k = \begin{bmatrix} D_x \\ D_y \end{bmatrix}$$

Here, $x_k$ may denote the position ($D_x$, $D_y$) of the object 20 and the velocity ($V_x$, $V_y$) of the object 20 estimated at the current time (kth scan) calculated based on the position ($D_x$, $D_y$) of the object 20 and the velocity ($V_x$, $V_y$) of the object 20 estimated at a prior time (k−1th scan). $z_k$ may denote the position estimated at the current time calculated based on the position and velocity of the object 20 measured at the prior time.

This estimation method is a result of estimation using a Kalman filter model. $w_k$ and $v_k$ may mean the noise generated while estimating at the current time.

$$\theta = \tan^{-1} \frac{V_y}{V_x} \quad \text{[Equation 2]}$$

FIG. 5 is a view illustrating an example of calculating a length of an object 20 according to an embodiment.

The object length calculation unit 140 may calculate the horizontal length of the object 20 based on the distance between a first straight line 410 passing through the calculated reflection point and the measurement, and calculate the vertical length of the object 20 based on the distance between a second straight line 420 orthogonal to the first straight line 410 and the measurement.

Specifically, the object length calculation unit 140 may calculate the horizontal length of the object 20 based on a first measurement 510 positioned at the farthest distance from the first straight line 410 and a second measurement 520 positioned at the farthest distance from the first straight line 410 in the direction opposite to the first measurement 510. The object length calculation unit 140 may calculate the sum of the distance between the first straight line 410 and the first measurement 510 and the distance between the first straight line 410 and the second measurement 520, as the horizontal length of the object 20.

Referring to FIG. 5, the object length calculation unit 140 may calculate the sum of the distance L1-1 between the first straight line 410 forming an angle θ with respect to the traveling direction of the host vehicle 11 and passing through the reflection point and the first measurement 510 positioned at the farthest distance and the distance L1-2 between the first straight line 410 and the second measurement 520 positioned at the farthest distance on the opposite side of the first straight line 410, as the horizontal length of the object 20.

Calculation of the vertical length of the object 20 is described. The object length calculation unit 140 may calculate the vertical length of the object 20 based on a third measurement 530 positioned at the farthest distance from a second straight line 420 orthogonal to the first straight line 410 and a fourth measurement 540 positioned at the farthest distance from the second straight line 420 in the direction opposite to the third measurement 530. The object length calculation unit 140 may calculate the sum of the distance between the second straight line 420 and the third measurement 530 and the distance between the second straight line 420 and the fourth measurement 540, as the vertical length of the object 20.

Referring to FIG. 5, the object length calculation unit 140 may calculate the sum of the distance L2-1 between the second straight line 420 orthogonal to the first straight line 410 and the third measurement 530 positioned at the farthest distance and the distance L2-2 between the second straight line 420 and the fourth measurement 540 positioned at the farthest distance on the opposite side of the second straight line 420, as the vertical length of the object 20.

The above-described vertical length and horizontal length of the object 20 are terms merely for distinguishing each other in calculating the lengths of the object 20, and may be interchangeable.

Further, for the first to fourth measurements 540, one measurement may be denoted by multiple measurements depending on the detected position of measurement. For example, a specific measurement may be denoted by the second measurement 520 positioned at the farthest distance from the first straight line 410 and the fourth measurement 540 positioned at the farthest distance from the second straight line 420.

FIG. 6 is a view illustrating an example of filtering a measurement depending on a size estimation range 610 according to an embodiment.

Referring to FIG. 6, the object length calculation unit 140 may calculate a reflection point except for measurements positioned outside a preset size estimation range 610.

Specifically, the fifth measurement 550 positioned outside the size estimation range 610 may be excluded when calculating the reflection point and when calculating the horizontal position frequency and vertical position frequency.

Not all of the measurements included in the reception signal mean the precise position of the object 20 and may include measurements positioned in a distance away from the object 20. If a reflection point is calculated with such measurements included, a difference may occur from the size of the actual object 20. It is possible to remove noise included in the reception signal by setting a size estimation range 610 for primary estimation of the size of the object 20. In other words, the size estimation range 610 may mean a primary filter.

The size estimation range 610 may be set based on image information obtained by detecting the object by the image sensor. Specifically, the type of the object 20 may be divided from the image information, and the size estimation range 610 may be set accordingly. For example, if the object is determined to be a vehicle, the size estimation range 610 may be set as the size of a lane. Further, the size estimation range 610 may be the same range as a track calculated based on a plurality of measurements.

The object size estimation unit 150 may estimate the size of the object 20 formed with a horizontal length and a vertical length.

Specifically, the object size estimation unit 150 may estimate the object 20 formed in a rectangle having a line of the horizontal length and a line of the vertical length, orthogonal to each other. Accordingly, the horizontal and vertical lengths of the object 20 may be identical to the horizontal length and vertical length calculated by the object length calculation unit 140.

Further, the object 20 may be estimated so that its sides include the first measurement 510, the second measurement 520, the third measurement 530, and the fourth measurement 540. Specifically, the object size estimation unit 150 may estimate that the object 20 is positioned in a position where the sides of the object 20 include the first measurement 510, the second measurement 520, the third measurement 530, and the fourth measurement 540 which are used when the object length calculation unit 140 calculates the lengths of the object 20.

Described below is a method for estimating the size of an object 20 using the object size estimation device 10 capable of performing the above-described disclosure.

Figure 7:
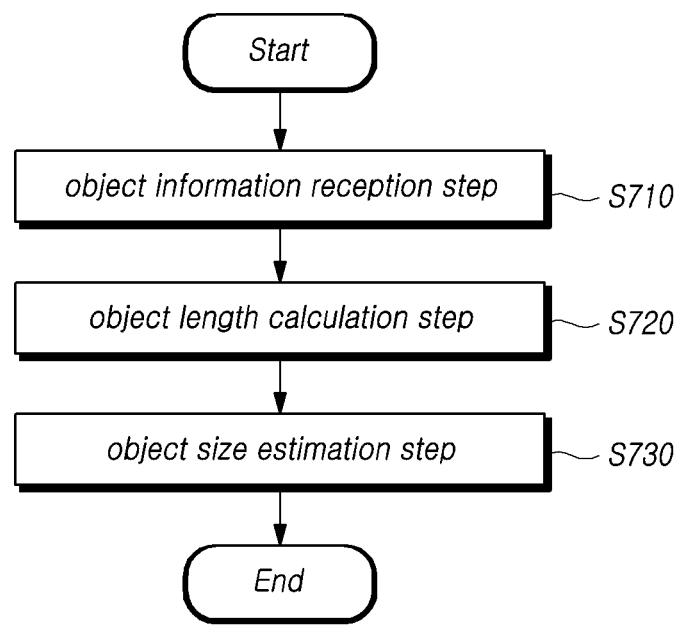
FIG. 7 is a flowchart illustrating an object size estimation method according to an embodiment of the disclosure.

FIG. 7 is a flowchart illustrating a method for estimating the size of an object 20 according to an embodiment of the disclosure.

Referring to FIG. 7, a method for estimating the size of an object 20 may include an operation information reception step S710 transmitting a radar signal to the object 20 using a transmission antenna and receiving a reception signal reflected by the object 20 through a reception antenna, an object length calculation step S720 calculating a reflection point based on a position frequency of measurements included in the reception signal, calculating a horizontal length of the object 20 based on a distance between a first straight line 410 passing through the calculated reflection point and a measurement and calculating a vertical length of the object 20 based on a distance between a second straight line 420 orthogonal to the first straight line and a measurement, and an object size estimation step S730 estimating a size of the object 20 formed with the horizontal length and the vertical length.

Figure 8:
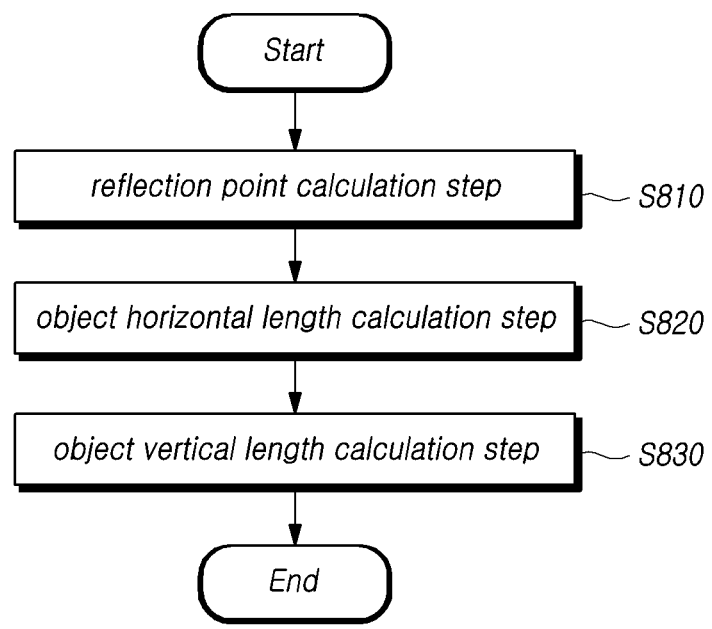
FIG. 8 is a flowchart illustrating, in greater detail, step S720 according to an embodiment.

FIG. 8 is a flowchart illustrating, in greater detail, step S720 according to an embodiment.

Referring to FIG. 8, the object size estimation device 10 may calculate a reflection point based on a measurement included in a reception signal (S810). Specifically, the object size estimation device 10 may calculate a position having the highest lateral position frequency of measurements and a position having the highest longitudinal position frequency of measurements, as the reflection point.

The object size estimation device 10 may calculate the horizontal length of the object 20 based on the distance between the measurement and the first straight line 410 passing through the calculated reflection point (S820). Specifically, the object size estimation device 10 may calculate the horizontal length of the object 20 based on a first measurement 510 positioned at the farthest distance from the first straight line 410 and a second measurement 520 positioned at the farthest distance from the first straight line 410 in the direction opposite to the first measurement 510. The object size estimation device 10 may calculate the sum of the distance between the first straight line 410 and the first measurement 510 and the distance between the first straight line 410 and the second measurement 520, as the horizontal length of the object 20.

The object size estimation device 10 may calculate the vertical length of the object 20 based on the distance between the measurement and the second straight line 420 orthogonal to the first straight line 410 (S830). Specifically, the object size estimation device 10 may calculate the vertical length of the object 20 based on a third measurement 530 positioned at the farthest distance from the second straight line 420 and a fourth measurement 540 positioned at the farthest distance from the second straight line 420 in the direction opposite to the third measurement 530. The object size estimation device 10 may calculate the sum of the distance between the second straight line 420 and the third measurement 530 and the distance between the second straight line 420 and the fourth measurement 540, as the vertical length of the object 20.

Figure 9:
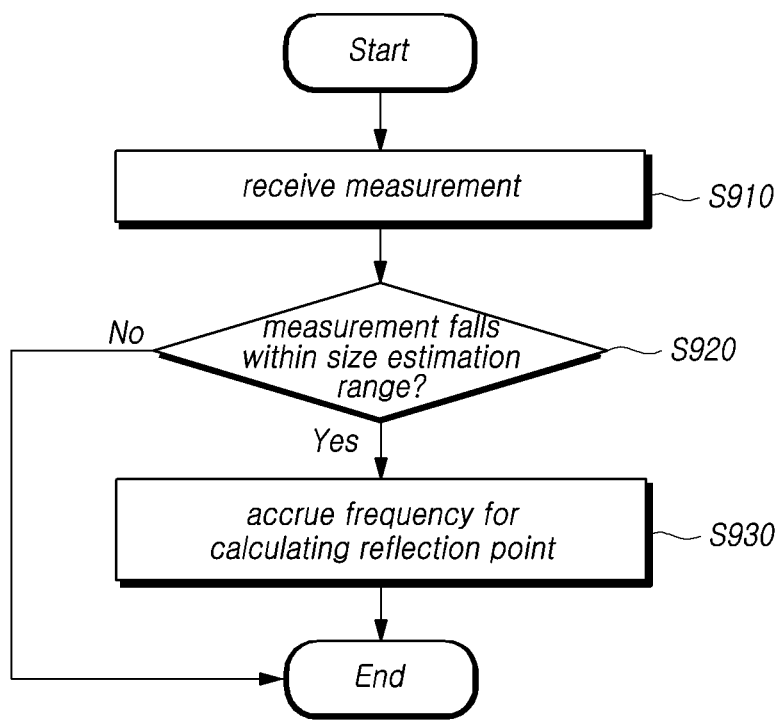
FIG. 9 is a flowchart illustrating, in greater detail, step S810 according to an embodiment.

FIG. 9 is a flowchart illustrating, in greater detail, step S810 according to an embodiment.

Referring to FIG. 9, the object size estimation device 10 may receive a measurement included in a reception signal (S910). Specifically, the object size estimation device 10 may store the detected position of measurement as two-dimensional coordinates.

The object size estimation device 10 may determine whether the position of the received measurement is included in the size estimation range 610 (S920).

When the position of the measurement is included in the size estimation range 610 (Yes in S920), the object size estimation device 10 may accrue the frequency for calculating the reflection point from the position of the measurement (S930).

When the position of the measurement is not included in the size estimation range 610 (No in S920), the object size estimation device 10 may exclude the fifth measurement 550 positioned outside the size estimation range 610 when calculating the reflection point. Measurements positioned outside the size estimation range 610 may also be likewise excluded when calculating the horizontal length and vertical length of the object 20. Further, the size estimation range 610 may be the same range as a track calculated based on a plurality of measurements.

As described above, according to the disclosure, the object size estimation device and method is able to estimate the size of an object 20 using measurements and enhance the performance of the autonomous emergency braking (AEB)/adaptive cruise control (ACC) system using the estimated size information about the detected object.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An advance driver assistance system in a host vehicle, comprising:
   a transmission antenna transmitting a radar signal to an object;
   a reception antenna receiving a reception signal reflected from the object, wherein the reception signal includes multiple measured points of the object, each of the multiple measured points denoted by a lateral position coordinate and a longitudinal position coordinate; and
   a calculator calculating and providing information related to driving of the host vehicle,
   wherein the calculator
      calculates a reference reflection point based on a position frequency of the lateral position coordinates and the longitudinal position coordinates of the multiple measured points,
      calculates a lateral length of the object based on distances between the multiple measured points and a first straight line passing through the calculated reference reflection point,
      calculates a longitudinal length of the object based on distances between the multiple measured points and a second straight line, the second straight line being orthogonal to the first straight line and passing through the calculated reference reflection point, and
      estimates and produces a size of the object formed with the lateral length and the longitudinal length.

2. The advance driver assistance system of claim 1, wherein calculator calculates the lateral length of the object based on a first measured point, from among the multiple measured points, positioned at a farthest distance from the first straight line and a second measured point, from among the multiple measured points, positioned at a farthest distance from the first straight line in a direction opposite to the first measured point.

3. The advance driver assistance system of claim 2, wherein the calculator calculates a sum of the distance between the first straight line and the first measured point and the distance between the first straight line and the second measured point, as the lateral length of the object.

4. The advance driver assistance system of claim 1, wherein the calculates the longitudinal length of the object based on a third measured point, from among the multiple measured points, positioned at a farthest distance from the second straight line and a fourth measured point, from among the multiple measured points, positioned at a farthest distance from the second straight line in a direction opposite to the third measured point.

5. The advance driver assistance system of claim 4, wherein the calculator calculates a sum of the distance between the second straight line and the third measured point and the distance between the second straight line and the fourth measured point, as the longitudinal length of the object.

6. The advance driver assistance system of claim 1, wherein the first straight line forms an angle with respect to a traveling direction of a host vehicle, and wherein the angle is determined based on a longitudinal velocity and a lateral velocity detected for the object.

7. The advance driver assistance system of claim 1, wherein the calculator calculates a point having a highest lateral position frequency and having a highest longitudinal position frequency from among the multiple measured points, as the reference reflection point.

8. The advance driver assistance system of claim 1, wherein the object is estimated as a rectangle having the size such that sides of the rectangle include a first measured point, a second measured point, a third measured point, and a fourth measured point.

9. The advance driver assistance system of claim 1, wherein, when the reference reflection point is calculated, a measured point positioned outside a preset size estimation range is excluded.

10. The advance driver assistance system of claim 9, wherein the size estimation range is the same range as a track calculated based on the multiple measured points.

11. The advance driver assistance system of claim 1, wherein driving of the host vehicle is adjusted based on the estimated size of the object.

12. The advance driver assistance system of claim 1, wherein two-dimensional coordinates denoted by the lateral position coordinates and the longitudinal position coordinates are defined on a plane where the host vehicle moves on the ground.

13. The advance driver assistance system of claim 1,
wherein, when a scanning is defined as the transmission antenna's transmission of the radar signal and the reception antenna's reception of the reception signal corresponding to the transmitted radar signal for a scan period, the scanning is repeatedly performed,
wherein the calculator is configured to estimate the lateral length and the longitudinal length based on the reception signal repeatedly received according to repetition of the scanning.

14. The advance driver assistance system of claim 13,
wherein, when the calculator's estimation of the lateral length and the longitudinal length is performed based on the reception signal repeatedly received according to N-times repetition of the scanning, a (N+1)th scanning, which is a next scanning after the Nth scanning, is simultaneously performed, N being a natural number.

* * * * *